(12) United States Patent  (10) Patent No.: US 9,130,785 B2
Beeler et al.  (45) Date of Patent: Sep. 8, 2015

(54) METHOD FOR THE DETECTION AND IDENTIFICATION OF FAILED ELECTRONIC RADIO FREQUENCY (RF) TRANSMISSION DEVICES

(75) Inventors: Michael Beeler, Jefferson, MD (US); Frederick Morris, Gathersburg, MD (US)

(73) Assignee: Comtech EF Data Corp., Tempe, AZ (US)

( * ) Notice: Subject to any disclaimer, the term of this patent is extended or adjusted under 35 U.S.C. 154(b) by 1178 days.

(21) Appl. No.: 13/089,079

(22) Filed: Apr. 18, 2011

(65) Prior Publication Data

US 2011/0193684 A1   Aug. 11, 2011

Related U.S. Application Data

(60) Provisional application No. 61/377,401, filed on Aug. 26, 2010.

(51) Int. Cl.
H04B 17/40   (2015.01)
H04L 25/20   (2006.01)
H04L 27/02   (2006.01)
H04B 7/185   (2006.01)

(52) U.S. Cl.
CPC ............ H04L 27/02 (2013.01); H04B 7/18519 (2013.01)

(58) Field of Classification Search
CPC ............... H04B 7/185; H04B 7/18502; H04B 7/18519; H04L 27/02; H04L 27/2601
USPC ........................................... 375/213
See application file for complete search history.

(56) References Cited

U.S. PATENT DOCUMENTS

| | | | | |
|---|---|---|---|---|
| 5,572,216 A * | 11/1996 | Weinberg et al. | .......... | 342/357.2 |
| 6,002,364 A * | 12/1999 | Kroeger et al. | ............... | 342/359 |
| 6,058,307 A * | 5/2000 | Garner | .......................... | 455/428 |
| 6,145,102 A * | 11/2000 | Klein et al. | .................. | 714/47.1 |
| 7,295,518 B1 * | 11/2007 | Monk et al. | .................... | 370/235 |
| 2004/0151255 A1 * | 8/2004 | Riazi et al. | ..................... | 375/260 |
| 2004/0223759 A1 * | 11/2004 | Fee | ................................ | 398/33 |
| 2009/0200985 A1 * | 8/2009 | Zane et al. | .................... | 320/108 |

* cited by examiner

*Primary Examiner* — David B Lugo
(74) *Attorney, Agent, or Firm* — Booth Udall Fuller, PLC

(57) ABSTRACT

A method and system for analyzing an electromagnetic (EM) carrier signal that is operating outside transmission parameters by determining that an original carrier signal is operating outside one or more transmission parameters, modulating the original carrier signal and a meta-carrier signal, the meta-carrier signal comprising meta-data that identifies a transmission source, such that a modulated composite carrier signal results, and transmitting the composite carrier signal to a remote receiving device.

44 Claims, 9 Drawing Sheets

METHOD FOR THE DETECTION AND IDENTIFICATION OF FAILED ELECTRONIC RADIO FREQUENCY (RF) TRANSMISSION DEVICES

CROSS REFERENCE TO RELATED APPLICATIONS

This document claims the benefit of the filing date of U.S. Provisional Patent Application No. 61/377,401, entitled "A Method for the Detection and Identification of Failed Electronic Radio Frequency (RF) Transmission Devices" to Frederick Morris, et al., which was filed on Aug. 26, 2010, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the advent of electromagnetic (EM) communications, a recurring problem that continues to challenge the industry is a Radio Frequency (RF) transmission device that fails in a manner that results in improper carrier signal transmission, thereby resulting in emissions that the device is not authorized to transmit. These rogue or improperly configured transmitted carrier signals are each known as "interferers." This problem is prevalent in the Very Small Aperture Terminal (VSAT) Satellite industry where the quality of the electronics is lower than that of larger earth stations, but this disclosure is not limited to satellite technology. As more devices enter service and the number of transmission devices continues to increase, the number of failures of the devices is more frequent in occurrence.

The interfering carrier signal may be caused by failed equipment that results in the transmission equipment transmitting or sweeping the wrong spectral location or locations—in this event this carrier is known as a "rogue carrier." Failure of the radio frequency (RF) transmission equipment in the satellite terminal results in, but is not limited to, transmitting on the wrong frequency, transmitting a continuous wave (CW) carrier, transmitting a sweeping carrier, transmitting at the wrong power, etc. In many cases, the failed electronic device causes an interruption to devices to which the terminal is authorized to transmit, but in most cases, the failure results in transmission in spectrum where the terminal is not authorized to transmit. In this scenario, an interruption results to users on other frequency spectrum.

A method is called for to first identify a failure of the RF transmit device and secondly, to insert an identification to assist a satellite operator, interference monitoring service, federal or state agency, or private or commercial operator, to rapidly identify the source of the interfering carrier using the methods described.

SUMMARY

Implementations of a method for analyzing an electromagnetic (EM) carrier signal that is operating outside transmission parameters may comprise determining, using a processing device, that an original carrier signal is operating outside one or more transmission parameters, modulating, using a modulator and in response to determining that the original carrier signal is operating outside the one or more transmission parameters, the original carrier signal and a meta-carrier signal, the meta-carrier signal comprising meta-data that identifies a transmission source, such that a modulated composite carrier signal results, and transmitting, using a transmitting device, the composite carrier signal to a remote receiving device.

Particular implementations may comprise one or more of the following features. The method may further comprise determining by the processing device, a center frequency of the original carrier signal using a Fourier Transform technique. The method may further comprise receiving, by the processing device, dynamic information relating to one or more detection characteristics, the dynamic information used to determine that an output signal from the electronic RF transmission device is operating outside one or more transmission parameters.

The method may further comprise determining by the processing device, an occupied bandwidth of the original carrier signal. The method may further comprise determining, using a power detector, a power level of the original carrier signal. The method may further comprise using, by the processing device, logic to determine the existence of sweeping or changing of frequency of the original carrier signal outside of a predetermined frequency range and attempting to mute the original carrier signal if it is determined that the original carrier signal is sweeping or changing frequency outside of the predetermined frequency range.

The method may further comprise using, by the processing device, logic to determine occupation by the original carrier signal of a bandwidth that exceeds a predetermined bandwidth range and attempting to mute the original carrier signal if it is determined that the original carrier signal occupies a bandwidth that exceeds the predetermined bandwidth range. The method may further comprise using, by the processing device, logic to determine occupation by the original carrier signal of a power level that is outside of a predetermined power level range and attempting to mute the original carrier signal if it is determined that the power level of the original carrier is outside the predetermined power level range.

The modulating may use an Amplitude Shift Keying (ASK) or an On-Off Keying (OOK) modulation technique. The determining and modulating may occur within a power amplifier device. The determining and modulating may occur after the composite carrier signal has been amplified by a power amplifier device. The method may further comprise powering the power amplifier device using energy from the composite carrier signal. The meta-data may further comprise a manufacturer or serial number of the transmitting device. The method may further comprise muting the original carrier signal and replacing the original carrier signal with a representation of the original carrier signal that is at the same frequency as the original carrier signal. The representation of the original carrier signal may be a continuous wave carrier signal. The method may further comprise modulating the continuous wave carrier signal.

Implementations of a method of receiving and identifying an electromagnetic (EM) carrier signal, may comprise receiving, by a receiving device, a modulated composite carrier signal comprising an original carrier signal and a meta-carrier signal, detecting, by a processing device, a modulated power envelope of the composite carrier signal, determining, by the processing device, based on the detection of the modulated power envelope of the composite carrier signal, that the composite carrier signal contains information that identifies a transmission source of the composite carrier signal, demodulating, using a demodulator, the modulated composite carrier signal such that a demodulated original carrier signal and a demodulated meta-carrier signal result, and decoding, using a decoder, the demodulated meta-carrier signal such that meta-data that identifies the transmission source of the composite carrier signal results.

Particular implementations may comprise one or more of the following features. The modulation technique may be Amplitude Shift Keying (ASK) or On-Off Keying (OOK). The method may further comprise recording, using a recording device, the demodulated composite carrier signal. The method may further comprise processing, using a spectrum analysis device, the demodulated composite carrier signal. The method may further comprise detecting based on a power detection output, that the composite carrier signal contains information that identifies the transmission source of the composite carrier signal prior to demodulating the composite carrier signal. The method may further comprise tracking the composite carrier signal if the composite carrier signal is sweeping or moving in frequency. The method may further comprise displaying, by a computing device, an output of the meta-data.

Implementations of a system for analyzing an electromagnetic (EM) carrier signal that is operating outside transmission parameters may comprise a processing device configured to determine that an original carrier signal is operating outside one or more transmission parameters, a modulator configured to modulate the original carrier signal and a meta-carrier signal in response to the processor determining that the original carrier signal is operating outside the one or more transmission parameters, the meta-carrier signal comprising meta-data that identifies a transmission source, such that a modulated composite carrier signal results, and a transmitting device configured to transmit the composite carrier signal to a remote receiving device.

Particular implementations may comprise one or more of the following features. The processing device may be further configured to determine a center frequency of the original carrier signal using a Fourier Transform technique. The processing device may be further configured to receive dynamic information relating to one or more detection characteristics, the dynamic information used to determine that an output signal from the electronic RF transmission device is operating outside one or more transmission parameters. The processing device may be further configured to determine an occupied bandwidth of the original carrier signal.

The system may further comprise a power detector configured to determine a power level of the original carrier signal. The processing device may be further configured to use logic to determine the existence of sweeping or changing of frequency of the original carrier signal outside of a predetermined frequency range and attempt to mute the original carrier signal if it is determined that the original carrier signal is sweeping or changing frequency outside of the predetermined frequency range. The processing device may be further configured to use logic to determine occupation by the original carrier signal of a bandwidth that exceeds a predetermined bandwidth range and attempt to mute the original carrier signal if it is determined that the original carrier signal occupies a bandwidth that exceeds the predetermined bandwidth range.

The processing device may be further configured to use logic to determine occupation by the original carrier signal of a power level that is outside of a predetermined power level range and attempt to mute the original carrier signal if it is determined that the power level of the original carrier is outside the predetermined power level range. The modulator may be further configured to use an Amplitude Shift Keying (ASK) or an On-Off Keying (OOK) modulation technique.

The system may further comprise an external power source configured to power the processing device, detection device, and embedding device.

The processing and detection devices are external to and downstream from the transmitting device. The power amplifier may be configured to be powered using energy from the composite carrier signal. The meta-data may further comprise a manufacturer or serial number of the transmitting device. The processing device may be further configured to mute the original carrier signal and replace the original carrier signal with a representation of the original carrier signal that is at the same frequency as the original carrier signal. T the representation of the original carrier signal may be a continuous wave carrier signal. The continuous wave carrier signal may be modulated.

Implementations of a system for receiving and identifying an electromagnetic (EM) carrier signal may comprise a receiving device configured to receive a modulated composite carrier signal comprised of an original carrier signal and a meta-carrier signal, a processing device configured to detect a modulated power envelope of the composite carrier signal and determine based on the detection, that the composite carrier signal contains information that identifies a transmission source of the composite carrier signal, a demodulator configured to demodulate the modulated composite carrier signal such that a demodulated original carrier signal and a demodulated meta-carrier signal result, and a decoder configured to decode the demodulated meta-carrier signal such that meta-data that identifies the transmission source of the composite carrier signal results.

Particular implementations may comprise one or more of the following features. The modulation technique may be Amplitude Shift Keying (ASK) or On-Off Keying (OOK). The system may further comprise a recording device configured to record the demodulated composite carrier signal. The system may further comprise a spectrum analysis device configured to observe and record the demodulated composite carrier signal. The processing device may be further configured to detect, based on a power detection output, that the composite carrier signal contains information that identifies the transmission source of the composite carrier signal prior to demodulation of the composite carrier signal. The system may further comprise a tracking device configured to track the composite carrier signal if the composite carrier signal is sweeping or moving in frequency. The system may further comprise a display configured to display an output of the meta-data.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
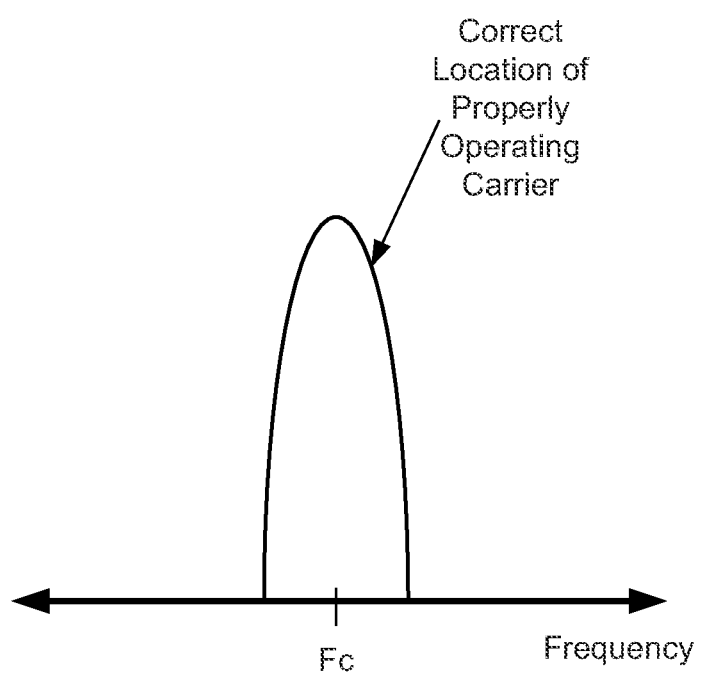
FIG. 1 shows an output of a properly operating electronic RF transmission device.

This disclosure, its aspects and implementations, are not limited to the specific components, frequency examples, or methods disclosed herein. Many additional components and assembly procedures known in the art consistent with a method for the detection and identification of failed electronic radio frequency (RF) transmission devices with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

Particular implementations of methods of detection and identification of failed transmit RF electronic devices with particular implementations from this disclosure are disclosed herein and may be specifically employed in satellite communications systems. However, as will be clear to those of ordinary skill in the art from this disclosure, the principles and aspects disclosed herein may readily be applied to any electromagnetic (IF, RF and optical) communications system, such as terrestrial or airborne transmitting networks without undue experimentation.

This disclosure relates to, but is not limited to, a method for the detection and identification of failed electronic RF transmission devices. Embodiments of methods described in this disclosure include, but are not limited to, the types of failures of electronic RF transmission devices and methods to combine the failed device's emissions with an identification carrier for remotely identifying the source of the failed electronic RF transmission device. Particular implementations described herein are and may use, but are not limited to, a Program Integrated Circuit (PIC), Field Programmable Gate Array (FPGA), Digital Signal Processor (DSP), Programmable Logic Device (PLD), Application Specific Integrated Circuit (ASIC), processor, and the like. The descriptions herein are made with reference to FIGS. 1-9. Aspects of this disclosure may use down conversion, reception, Fourier transform (FT), digital processing techniques, modulation, up-conversion, and/or processing of the transmitted carrier that comprises the methods described herein.

More specifically, this disclosure relates to a method of embedding information regarding an electromagnetic transmission's origin in the event the electronic RF transmission device fails in a manner resulting in violation of a pre-defined set of rules for improper transmission. It also provides the ability to provide information about a carrier signal's source to include information about the transmission equipment (such as for example, manufacturer, model, serial number, configuration, etc.), location (address, latitude, and/or longitude), and/or contact information, type of carrier signal, target or proposed destination, or any other relevant information. Particular embodiments disclosed herein relate to a method that can be employed for an electromagnetic (EM) emitting device, such as optical or Radio Frequency (RF) transmission equipment for point-to-point, point-to-multipoint and/or multipoint-to-multipoint for embedded information.

An implementation of a method for embedding information about the carrier signal and RF transmission device may be accomplished by combining the original carrier signal having the desired information, regardless of the modulation type, rate or forward error correction, after the transmission equipment has failed, with an application of very low-data rate information about the failed device (known as the "identification" after modification). The very low data rate identification carrier signal may use, but is not limited to, On-Off Keying (OOK), Amplitude Shift Keying (ASK), or any other appropriate modulation format.

Figure 2:
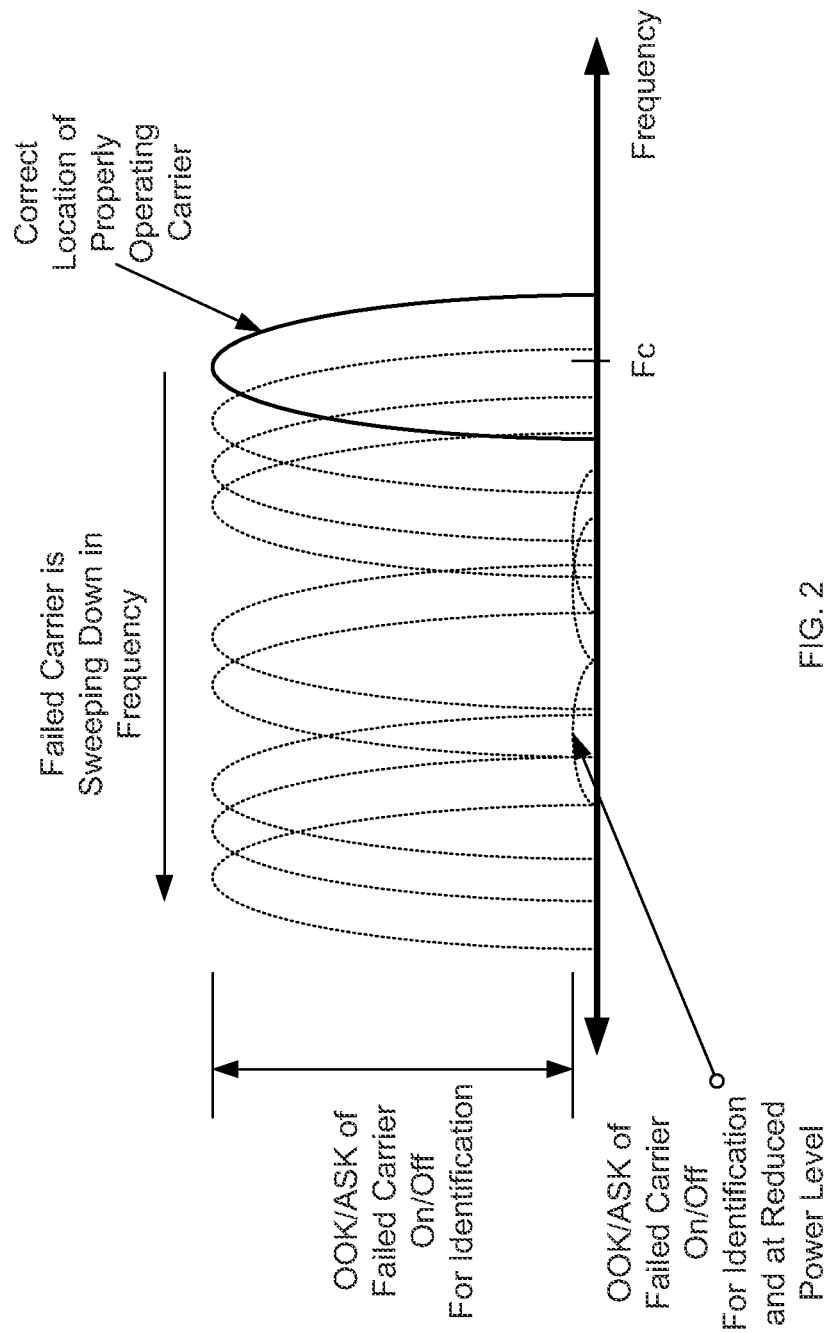
FIG. 2 shows an output of a failed electronic RF transmission device in which the output carrier signal is sweeping from the assigned frequency to a lower frequency.
Figure 3:
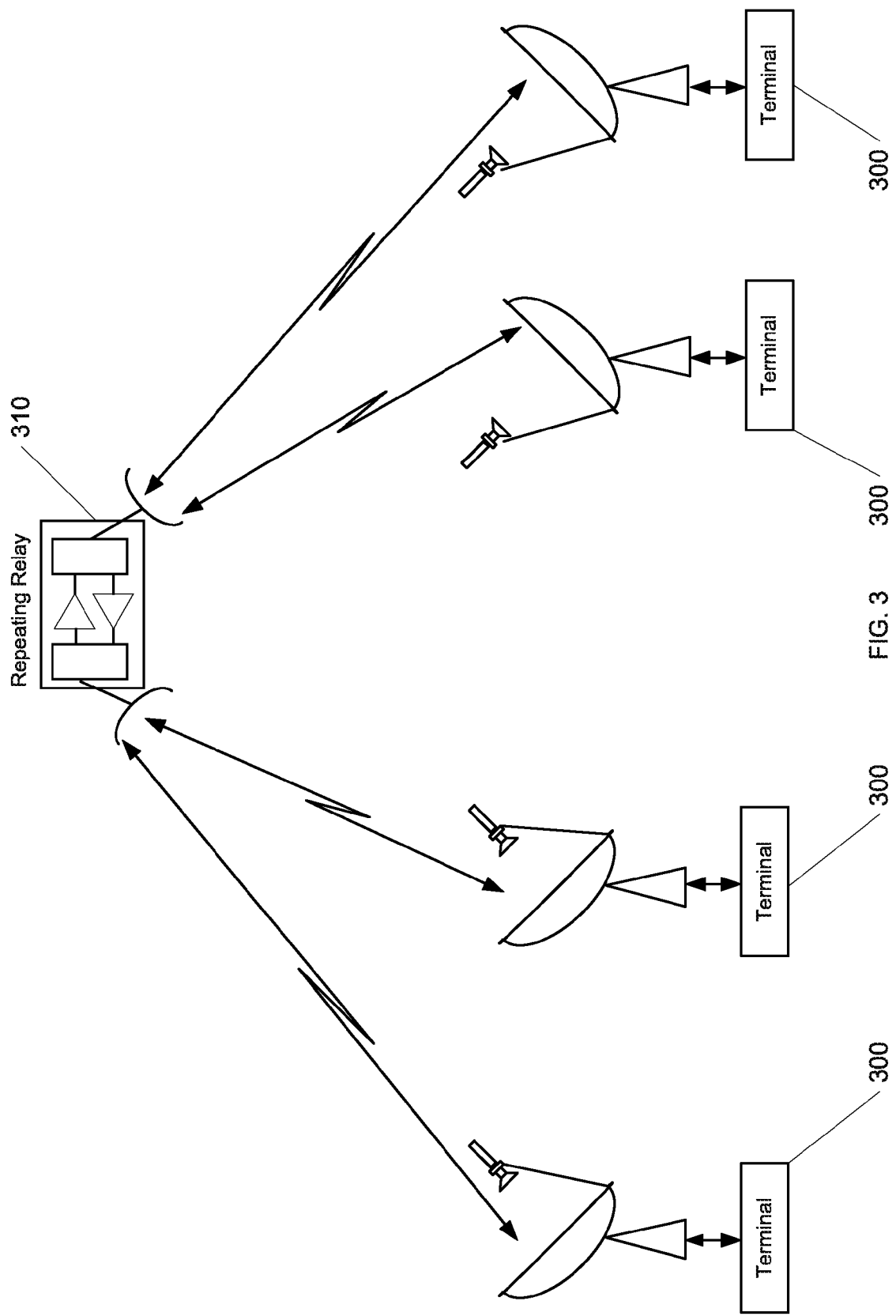
FIG. 3 is a representation of an implementation of a transmission network using a satellite-based repeating relay.

FIG. 1 illustrates a non-limiting example of a carrier signal having a center frequency, bandwidth, and power level within normal operating parameters and that is produced by a properly operating electronic RF transmission device. Conversely, FIG. 2 shows a non-limiting example of a process of applying very low-data rate information via OOK, ASK or any other suitable modulation format when the carrier signal has become unstable due to a failure of a phase-lock loop, resulting in the carrier signal sweeping in frequency.

An indication of the need or ability to determine the metrics of failure of an RF transmission device may include, but is not limited to, the carrier signal emitted by the electronic RF transmission device sweeping over a frequency or operating over allocated power, transmitting a continuous wave (CW), or emitting spurious transmission. Once it is determined that the device has failed, the first attempt may be to send a signal to the health and status or power management of the unit as notification that the unit is operating outside the established criteria and an attempt to shutdown the device. In addition to the failure notification, identification data may be injected into the RF stream as a method of identifying the source of the transmission in the event of the failure. Particular implementations disclosed herein are included in a method that can be employed for an electronic RF transmission device, such as optical or Radio Frequency (RF) transmission equipment for point-to-point, point-to-multipoint and/or multipoint-to-multipoint for embedded information as shown in the representative example shown in FIG. 3 which illustrates an implementation of a satellite transmission network comprised of earth stations 300 that transmit and receive EM carrier signals. In a particular embodiment, the output of the electronic RF transmission device is focused into a satellite antenna and directed to a satellite-based repeating relay 310, a non-limiting example of which is shown in FIG. 4.

Figure 4:
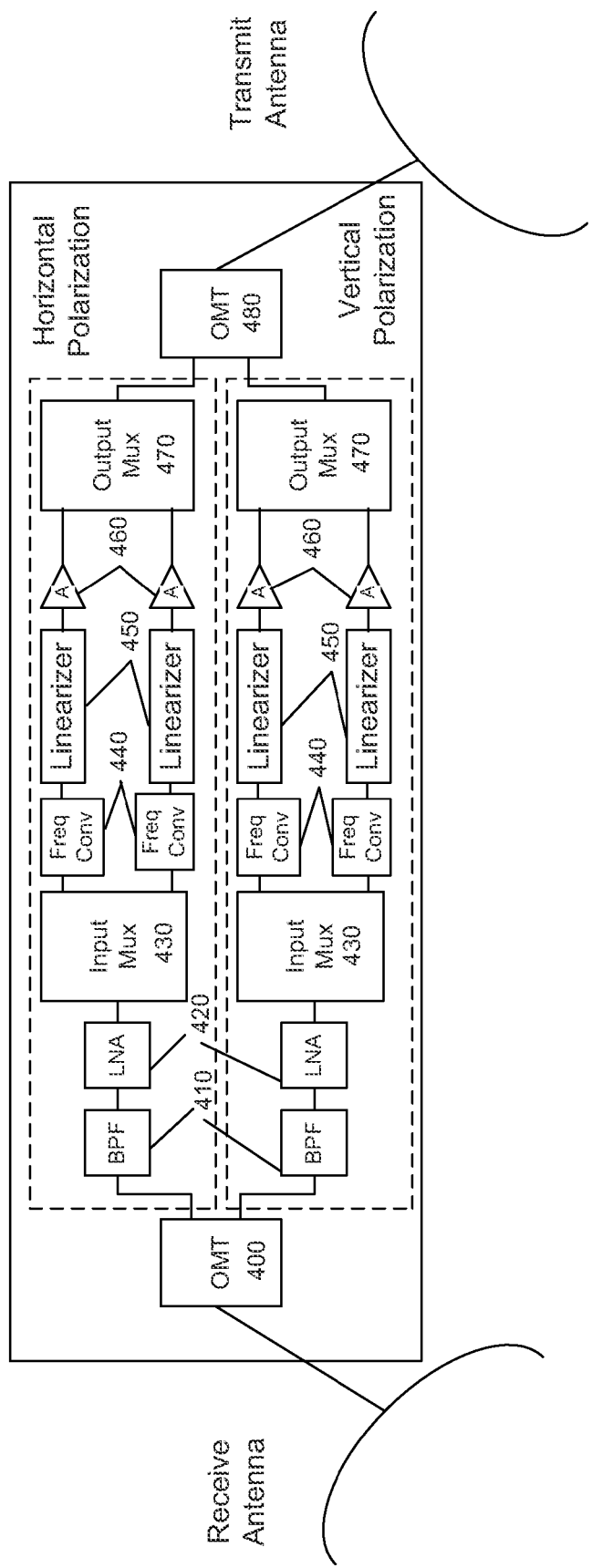
FIG. 4 is a diagram of an implementation of a satellite-based repeating relay used for satellite communications.

Referring now to FIG. 4, in some implementations, the input signal may be received at radio frequency (RF) and split to the proper polarization by on Orthogonal Mode Transducer (OMT) 400. The split signal may then be band-pass filtered (BPF) 410, amplified by a Low Noise Amplifier (LNA) 420, separated in frequency by an Input Multiplexer 430, frequency converted 440 up or down in frequency, linearized 450, amplified 460 and multiplexed 470 with other transponders and then combined by an OMT 480 to the proper polarization and transmitted by a transmit antenna from the relay to the receive location. In particular embodiments, the remote relay may operate over one or more of L-Band, S-Band, C-Band, X-Band, Ku-Band, Ka-Band, or another suitable communication band.

An RF transmission device may fall into a non-exhaustive list of transmission devices known in the art as Up-Converter (UC), Block Up-Converter (BUC), Solid State Power Amplifier (SSPA), a simple amplifier (AMP), and the like. Each of these devices, alone or in combination, may fail in a manner resulting in improper frequency, bandwidth, power, spurious emissions from the device, and the like. In conventional systems, only the power is detected and monitored for proper operation.

Figure 5:
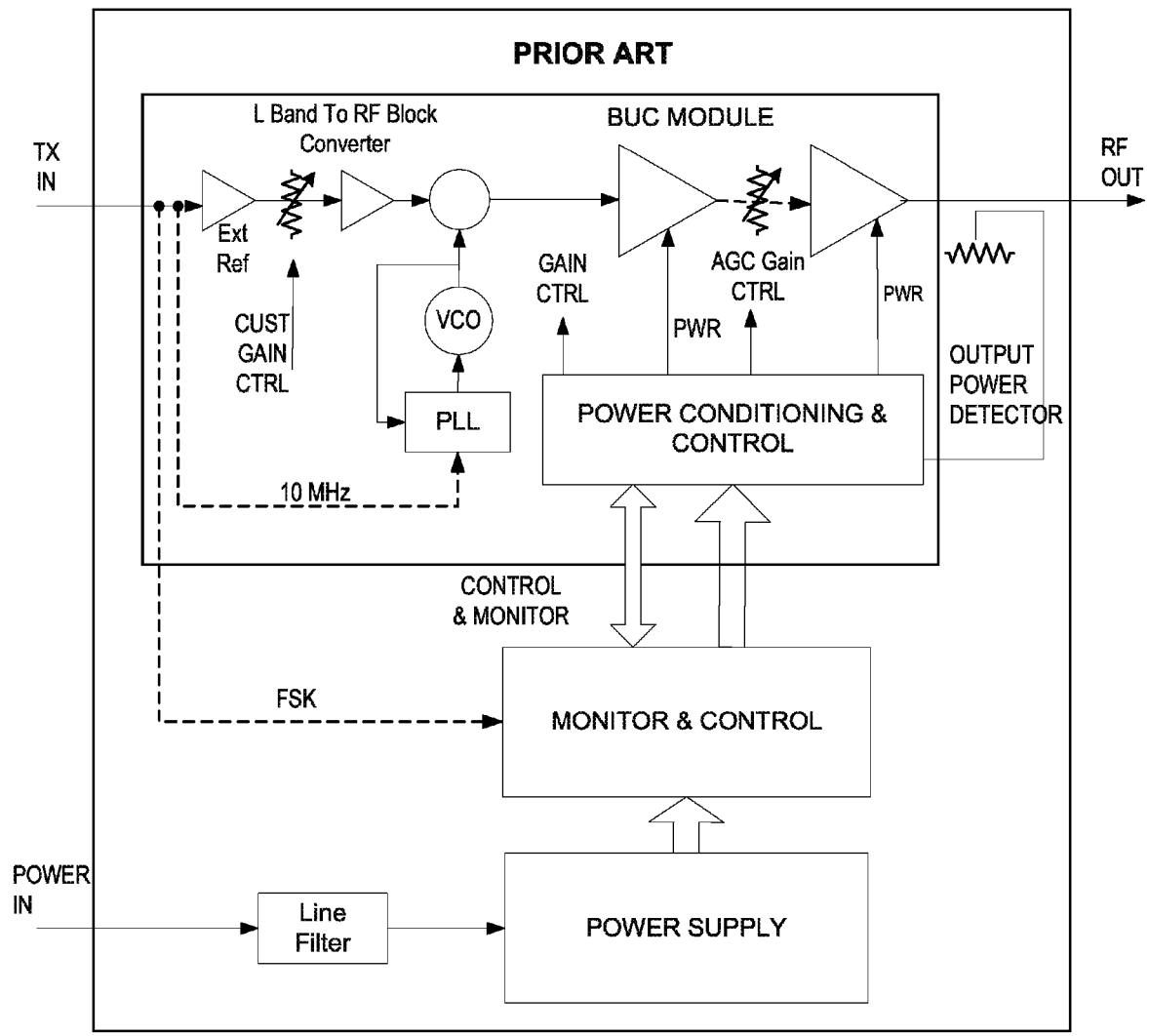
FIG. 5 is a block diagram showing a prior art implementation of an electronic RF transmission device without failure detection or an identification transmission circuit.

An example of a conventional system, in which only the monitoring of the output power is monitored for proper operation, is shown in FIG. 5. Such an electronic RF transmission device contains no provisions for detecting a failure condition or transmitting an identification carrier sequence other than monitoring the output power level of the device.

Figure 6:
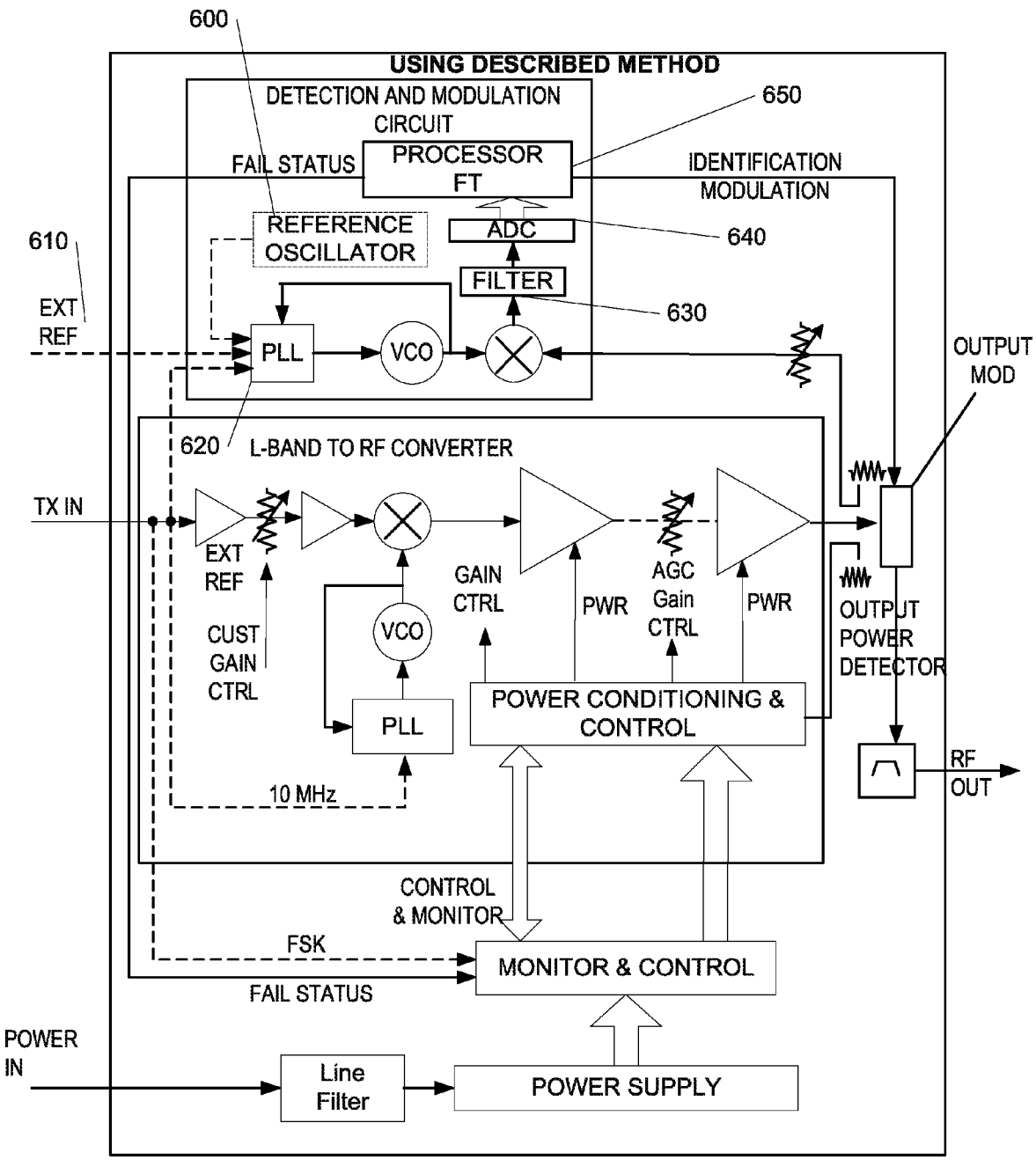
FIG. 6 is a block diagram showing an implementation of a down conversion stage and failure detection and identification circuit of an electronic RF transmission device.
Figure 7:
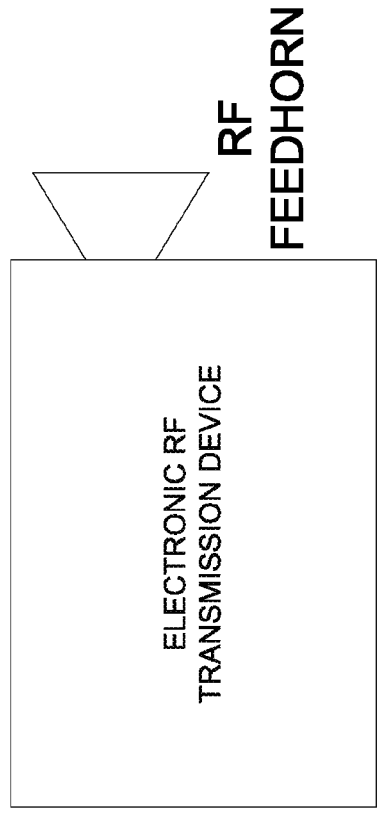
FIG. 7 is a block diagram showing an implementation of an external detection device and identification device.
Figure 7:
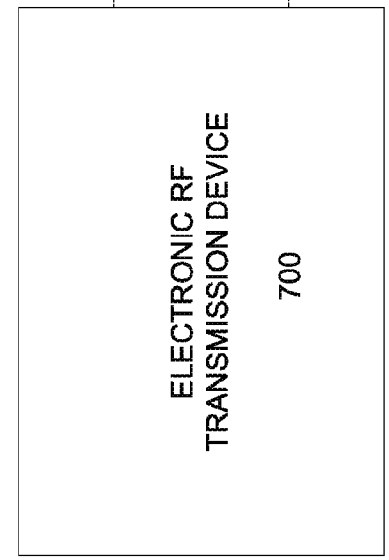

FIG. 6 shows an implementation of a circuit for the detection, notification and transmission of an identification of a failed electronic RF device. Methods described herein for embedding information about the source device, origin and/or configuration of a carrier signal may be accomplished in a multitude of ways. In one implementation, the carrier identification information may be embedded in a post RF amplification format within the device, as shown in FIG. 6, or alternatively in an ancillary device in an external manner as shown in FIG. 7. The external or ancillary method is considered inline and downstream (on the Radio Frequency (RF) side) of the output of the electronic RF transmission device. In both embodiments, a directional coupler is utilized to passively detect the output of the transmission and then provide the output to a down-conversion device, where the passband of the transmission device is converted from RF to baseband frequencies. In most satellite devices, the common RF frequencies are L-Band, S-Band, C-Band, X-Band, Ku-Band, Ka-Band, however, one or ordinary skill in the art would recognize that any band suitable for communication may be used. The most common passband of the RF electronics is 500 MHz.

Particular implementations of a method combine monitoring of the output frequency (accuracy), stability (sweeping/dithering), bandwidth and power level, and report a failure of the RF transmission device as shown in FIG. 6. A directional coupler is used to passively extract energy from the output passband. In a particular embodiment, the output signal may be L-Band, S-Band, C-Band, X-Band, Ku-Band, Ka-Band, or any band suitable for communications, and is typically, but is not limited to, 500 MHz wide. The frequency, at RF, may be down-converted using the provided reference, a secondary reference oscillator 600, or an external reference 610 that is phase-locked via a phase-lock loop (PLL) to the reference frequency, typically, but not limited to 10 MHz, and the RF output may be down-converted to an intermediate frequency (IF), such as, but not limited to, L-Band that may operate from 950 to 1,450 MHz. The 500 MHz pass band at L-Band may be filtered 630, sampled by a Analog to Digital Converter (ADC) 640 and input to a processing device 650, such as, but not limited to, a Program Integrated Circuit (PIC), Field Programmable Gate Array (FPGA), Digital Signal Processor (DSP), Programmable Logic Device (PLD), Application Specific Integrated Circuit (ASIC), processor, and the like, in a parallel or serial fashion for processing.

FIG. 7 shows an implementation in which a method such as those described herein may be used between the failed RF transmission device 700 and a feed horn 710 to monitor the output of the device, and in the event of detection of failure 720, the method may be implemented through physical components. In this embodiment, external failure detection 720 is performed. The detection would be performed as described in an embedded embodiment, but the modulation of the carrier may be performed using a plurality of methods. One such method, though not required in all methods, may mute or attenuate the carrier to energize a waveguide switch to redirect the energy from the RF feed horn 710 to a dummy load. In another method implementation, a shutter may be opened and closed, partially or completely, to modulate the output energy that is directed to the feed horn. The resulting modulation of the energy would produce an OOK or ASK modulated carrier. Another such method embodiment would insert Microelectromechanical Systems (MEMS) or carbon nanotube technology on a membrane or panel that is placed in line in the external failure detection device (waveguide) body that may be electronically controlled to modulate the energy flowing through the waveguide to produce an OOK or ASK modulated waveform.

Figure 8:
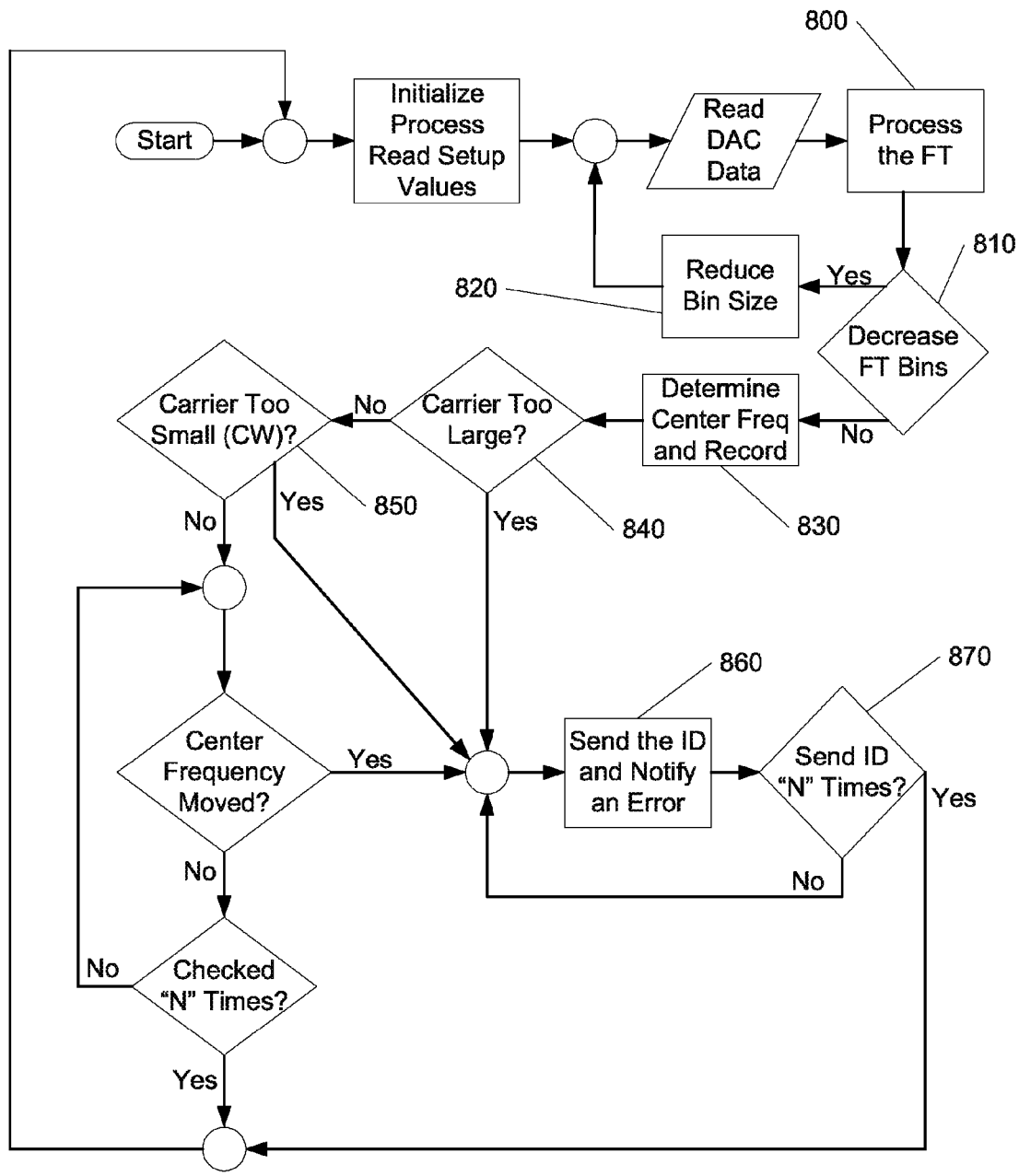
FIG. 8 is a flow diagram of an implementation for analyzing spectral energy and determining the status of an implementation of an electronic RF transmission device.

The processing device may implement a logic flow for analyzing the spectral energy and determining the status of the electronic RF transmission device as shown in FIG. 8. The processing device starts the first phase of the analysis by performing a series of Fourier Transform techniques, such as, but not limited to, Fast-Fourier Transforms (FFT's). First, a wide FFT may be performed 800 to ascertain the location of the energy in a limited number of wide bins. Once the energy has been identified, the FFT may determine to transition 810 to a second, more narrow, frequency range with more narrow FFT bins. The reduction in bin width 820 may be repeated, iteratively, until it has been determined by finding and recording the center frequency 830 that the energy is within the confines of the maximum carrier bandwidth. In a particular embodiment, this a carrier would be considered too large 840 if it exceeds the entire width of the largest known satellite-based relay repeater that is 72 MHz. If the iterative reduction of bins results in a reduction of the bins to the smallest configured value 850, the carrier would be considered to be a continuous wave (CW).

The operation of sending a CW may not comprise a failure, but a dwell period may, though not required, to be set so that if the CW condition exists for more than a pre-set period of time, the condition is considered as a failure. If the FFT reports a carrier that exceeds the maximum allowed carrier bandwidth, then this condition is considered to be a result of a failure of the RF transmission device.

Once the carrier has been analyzed for proper operation (falls between the maximum and minimum) spectral width (bandwidth), then iterative checking may be preformed to ascertain if the carrier is "drifting" or "sweeping." The FFT, once it settles on the width of the carrier, may then determine the center frequency 830. The center frequency for a constant carrier device will have minimal variability or "drift." However, a carrier signal for a Multiple Frequency-Time Division Multiple Access (MF-TDMA) network may change frequencies rapidly. To address the carrier signal that bursts on and off, the algorithm may be restarted each time the carrier is turned off and back on. A condition of failure may be due to a constant carrier signal (in the "on" condition) sweeping over more than an acceptable range for more than an allotted time.

An additional output from the FFT may be the detected power level of the carrier. Even with the power detection circuits, as illustrated by conventional systems, additional verification may be performed by the FFT, where the carrier power is verified to be operating at or below the rated power level of the electronic RF transmission device.

Upon detection of a failure condition, the detection logic may output a signal to notify the electronic RF transmission device of the failure 860. In one embodiment, the failure condition may be used to reset the electronic RF transmitter's logic or power system to recover the unit. However, in another embodiment, the failure signal may signal the identification transmission logic to start 870.

Figure 9:
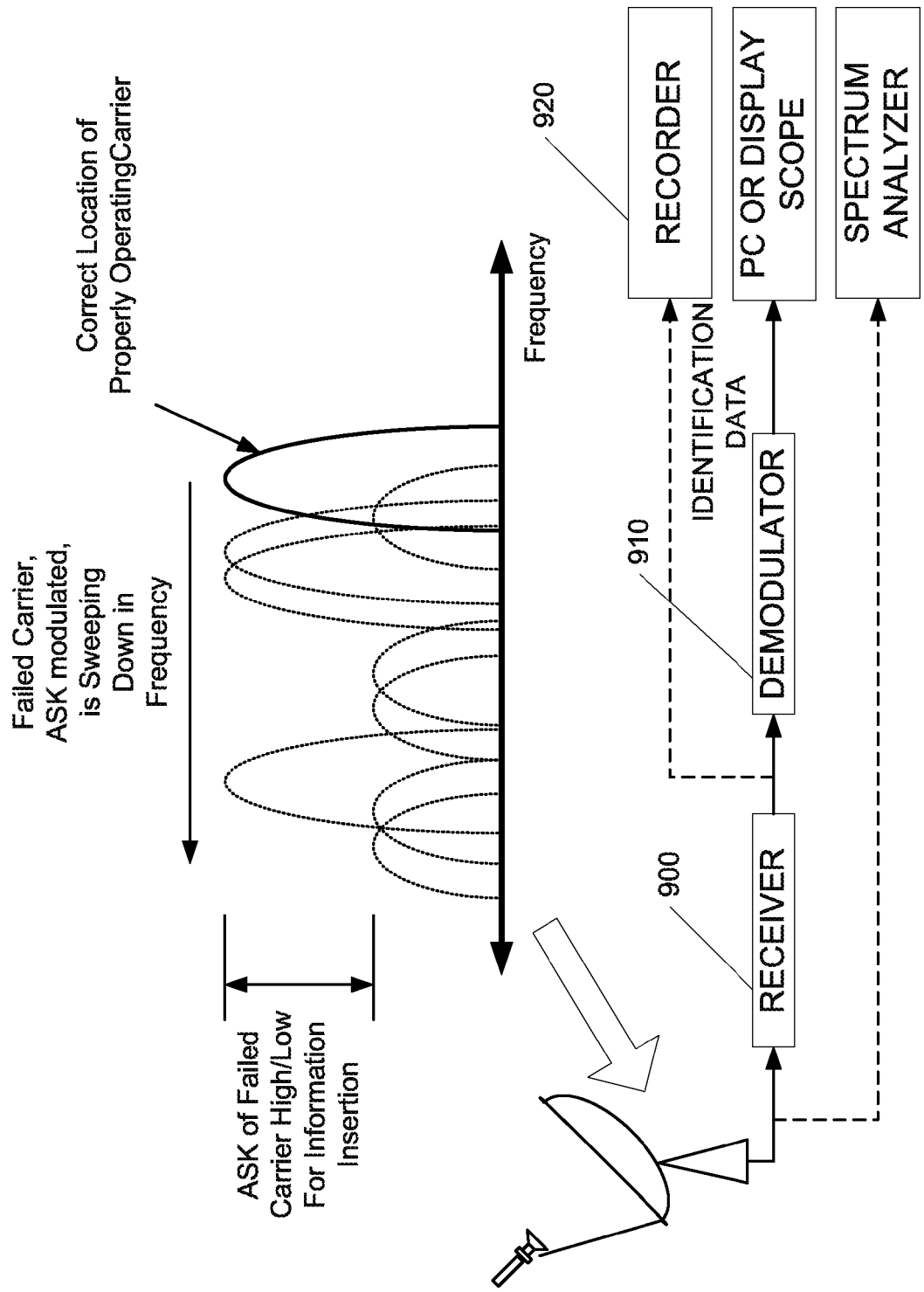
FIG. 9 is an implementation of a receiving device for recording and demodulating a signal transmitted by a failed electronic RF transmission device.

The identification transmission logic enables the output of a transmission sequence to be combined with the output carrier. The information contained in the identification sequence may be but is not limited to manufacturer, model, serial number, configuration, location (such as address, latitude and/or longitude), contact information, type of carrier and/or target or proposed destination, or any other relevant information. During the failed condition, the output bit stream is modulated using any well known modulation scheme. A decoder that recovers the identification-carrier may be used by an interested party, such as satellite operators, federal agencies, or network management firm to remotely detect record and demodulate 910 the behavior of the failed carrier. Through the use of the receiving device 900 with an OOK, ASK, etc. demodulator 910, the recording 920 may be used to recover the identification-carrier data of the failed carrier as shown in FIG. 9.

In a particular embodiment, the output may use On-Off Keying (OOK) or Amplitude Shift Keying (ASK), since it may easily be demodulated for rapid determination of the source of the transmission. Additionally, in the event of a "sweeping" or "dithering" carrier, OOK and ASK may be decoded actively or by post processing a recorded transmission by counting the number of transitions to aid in the rapid determination of the source of the transmission as shown in FIG. 9 which depicts an implementation of a receiving device 900 for recording 920 and demodulating 910 a signal transmitted by a failed electronic RF transmission device.

The OOK carrier may be created by dynamically muting output carrier power using a PIN diode. The ASK carrier may be created by dynamically padding the output carrier power using an electronically controlled padding (attenuator). In certain instances, ASK may have an advantage over OOK, since ASK does not completely mute the carrier, so tracking the decoded signal may be accomplished more easily. By using OOK or ASK, the complexity of the design and implementation is tremendously reduced, but the method is not solely limited to these two modulation types as any appropriate modulation type may be used. The rate of the OOK or ASK modulation may be fixed at a low rate and repeated in a periodic fashion. A more complex modulation scheme may be brought to bear, but tracking and decoding complexity will result. The output modulation may be filtered to prevent sin x/x lobes from being emitted by the OOK and or ASK modulation, but at low data rates, the effects of switching the carrier on and off will be minimal.

The following are particular implementations and embodiments of techniques for detection and identification of failed electronic RF transmission devices, provided as non-limiting examples of how the methods may operate and be used:

EXAMPLE 1

A satellite earth station is configured to operate at an assigned center frequency, symbol rate and polarization to a satellite at a geo-equatorial location, polarization and frequency. For this example, the earth station is correctly pointed to the proper satellite and is transmitting. During transmission the Phase-Lock Loop (PLL) in the electronic RF transmission device fails resulting in the carrier signal being transmitted sweeping up or down in frequency from the earth station's assigned center frequency. In the event the improperly radiated satellite has the frequencies being swept also assigned for use for another carrier signal, the result is interference or an outage due to energy being injected into the satellite's transponder and being received by devices not intended to receive this carrier signal. The methods disclosed herein, when embedded into an electronic RF transmission device, allow one to detect the failed carrier, modulate the failed carrier signal using OOK, ASK, or any other appropriate modulation format to insert the failed carrier signal's identification, thus providing information about the failed RF transmission device to interested parties, such as satellite operators, federal agencies, network management firms, and the like.

EXAMPLE 2

In particular implementations of the system described in Example 1, a satellite earth station may be configured to operate at an assigned center frequency, symbol rate and polarization to a satellite at a geo-equatorial location, polarization and frequency. For this example, the earth station is correctly pointed to the proper satellite and is transmitting. During transmission, the electronic RF transmission device emits spurious emissions resulting in energy being emitted outside of the configured passband. In the event energy is detected outside of the passband, the result is interference or an outage due to energy being injected into the satellite's transponder and being received by devices not intended to receive this carrier signal. The methods disclosed herein, when embedded into an electronic RF transmission device, allow one to detect the failed carrier signal, modulate the failed carrier signal using OOK, ASK, or any other appropriate modulation format to insert the failed carrier signal's identification, thus providing information about the failed RF transmission device to interested parties, such as satellite operators, federal agencies, network management firms, and the like.

EXAMPLE 3

In particular implementations of the system described in Example 1, a satellite earth station may be configured to operate at an assigned center frequency, symbol rate and polarization to a satellite at a geo-equatorial location, polarization and frequency. For this example, the earth station is correctly pointed to the proper satellite and is transmitting. During transmission, the electronic RF transmission device emits too much power resulting in energy above the configured power. In the event energy is above of the proper power level, the result is too much power being injected into the satellite's transponder. The methods disclosed herein, when embedded into an electronic RF transmission device, allow one to detect the failed carrier signal, modulate the failed carrier signal using OOK, ASK, or any other appropriate modulation format to insert the failed carrier's identification, thus providing information about the failed RF transmission device to interested parties, such as satellite operators, federal agencies, network management firms, and the like.

EXAMPLE 4

A satellite earth station is configured to operate at an assigned center frequency, symbol rate and polarization to a satellite at a geo-equatorial location, polarization and frequency. For this example, the earth station is correctly pointed to the proper satellite and is transmitting. During transmission, the Phase-Lock Loop (PLL) in the electronic RF transmission device fails resulting in the carrier signal being transmitted sweeping up or down in frequency from the earth station's assigned center frequency. In the event that the improperly radiated satellite has the frequencies being swept also assigned for use for another carrier signal, the result is interference or an outage due to energy being injected into the satellite's transponder and being received by devices not intended to receive this carrier signal. The methods disclosed herein, when implemented as an external failure detection device outside of the electronic RF transmission device, allow one to detect the failed carrier signal, modulate the failed carrier signal using OOK, ASK, or any other appropriate modulation format to insert the failed carrier signal's information, thus providing information about the failed RF transmission device to interested parties, such as satellite operators, federal agencies, network management firms, and the like.

EXAMPLE 5

In particular implementations of the system described in Example 4, a satellite earth station may be configured to operate at an assigned center frequency, symbol rate and polarization to a satellite at a geo-equatorial location, polarization and frequency. For this example, the earth station is correctly pointed to the proper satellite and is transmitting. During transmission, the electronic RF transmission device emits spurious emissions resulting in energy being emitted outside of the configured passband. In the event energy is detected outside of the passband, the result is interference or an outage due to energy being injected into the satellite's transponder and being received by devices not intended to receive this carrier signal. The methods disclosed herein, when implemented as an external failure detection device outside of the electronic RF transmission device, allow one to detect the failed carrier signal, modulate the failed carrier signal using OOK, ASK, or any other appropriate modulation format to insert the failed carrier signal's identification, thus providing information about the failed RF transmission device to interested parties, such as satellite operators, federal agencies, network management firms, and the like.

EXAMPLE 6

In particular implementations of the system described in Example 4, a satellite earth station is configured to operate at an assigned center frequency, symbol rate and polarization to a satellite at a geo-equatorial location, polarization and frequency. For this example, the earth station is correctly pointed to the proper satellite and is transmitting. During transmission, the electronic RF transmission device emits too much power resulting in energy above the configured power. In the event that the energy is above that of the proper power level, the result is too much power being injected into the satellite's transponder. The methods disclosed herein, when implemented as an external failure detection device outside of the electronic RF transmission device, allow one to detect the failed carrier signal, modulate the failed carrier signal using OOK, ASK, or any other appropriate modulation format to insert the failed carrier signal's identification, thus providing information about the failed RF transmission device to interested parties, such as satellite operators, federal agencies, network management firms, and the like.

EXAMPLE 7

A satellite earth station's electronic RF transmission device fails, resulting in a continuous wave (CW) carrier being produced. The methods disclosed herein, when embedded into an electronic RF transmission device, allow one to detect a CW carrier signal, modulate the failed carrier signal using OOK, ASK, or any other appropriate modulation format to insert the failed carrier signal's identification, thus providing information about the failed RF transmission device to interested parties, such as satellite operators, federal agencies, network management firms, and the like.

EXAMPLE 8

A satellite earth station's electronic RF transmission device fails, resulting in a continuous wave (CW) carrier being produced. The methods disclosed herein, when implemented as an external failure detection device outside of the electronic RF transmission device, allow one to detect the failed carrier signal, modulate the failed carrier signal using OOK, ASK, or any other appropriate modulation format to insert the failed carrier signal's identification, thus providing information about the failed RF transmission device to interested parties, such as satellite operators, federal agencies, network management firms, and the like.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method for analyzing an electromagnetic (EM) carrier signal that is operating outside transmission parameters, the method comprising:
   determining, using a processing device, that an original carrier signal is operating outside one or more transmission parameters;
   modulating, using a modulator and in response to determining that the original carrier signal is operating outside the one or more transmission parameters, the original carrier signal and a meta-carrier signal, the meta-carrier signal comprising meta-data that identifies a transmission source, such that a modulated composite carrier signal results;
   transmitting, using a transmitting device, the composite carrier signal to a remote receiving device; and
   muting the original carrier signal and replacing the original carrier signal with a representation of the original carrier signal that is at a same frequency as the original carrier signal.

2. The method of claim 1, further comprising determining by the processing device, a center frequency of the original carrier signal using a Fourier Transform technique.

3. The method of claim 1, further comprising receiving, by the processing device, dynamic information relating to one or more detection characteristics, the dynamic information used to determine that an output signal from the electronic RF transmission device is operating outside one or more transmission parameters.

4. The method of claim 1, further comprising determining by the processing device, an occupied bandwidth of the original carrier signal.

5. The method of claim 1, further comprising determining, using a power detector, a power level of the original carrier signal.

6. The method of claim 2, further comprising:
   using, by the processing device, logic to determine the existence of sweeping or changing of frequency of the original carrier signal outside of a predetermined frequency range; and
   attempting to mute the original carrier signal if it is determined that the original carrier signal is sweeping or changing frequency outside of the predetermined frequency range.

7. The method of claim 4, further comprising:
   using, by the processing device, logic to determine occupation by the original carrier signal of a bandwidth that exceeds a predetermined bandwidth range; and
   attempting to mute the original carrier signal if it is determined that the original carrier signal occupies a bandwidth that exceeds the predetermined bandwidth range.

8. The method of claim 5, further comprising:
   using, by the processing device, logic to determine occupation by the original carrier signal of a power level that is outside of a predetermined power level range; and
   attempting to mute the original carrier signal if it is determined that the power level of the original carrier is outside the predetermined power level range.

9. The method of claim 1, wherein the modulating uses an Amplitude Shift Keying (ASK) or an On-Off Keying (OOK) modulation technique.

10. The method of claim 1, wherein the determining and modulating occur within a power amplifier device.

11. The method of claim 1, wherein the determining and modulating occur after the composite carrier signal has been amplified by a power amplifier device.

12. The method of claim 11, further comprising powering the power amplifier device using energy from the composite carrier signal.

13. The method of claim 1, wherein the meta-data further comprises a manufacturer or serial number of the transmitting device.

14. The method of claim 1, wherein the representation of the original carrier signal is a continuous wave carrier signal.

15. The method of claim 14, further comprising modulating the continuous wave carrier signal.

16. The method of claim 1, further comprising:
   receiving, by a receiving device, a modulated composite carrier signal comprising an original carrier signal and a meta-carrier signal;
   detecting, by a processing device, a modulated power envelope of the composite carrier signal;
   determining, by the processing device, based on the detection of the modulated power envelope of the composite carrier signal, that the composite carrier signal contains information that identifies a transmission source of the composite carrier signal;
   demodulating, using a demodulator, the modulated composite carrier signal such that a demodulated original carrier signal and a demodulated meta-carrier signal result; and
   decoding, using a decoder, the demodulated meta-carrier signal such that meta-data that identifies the transmission source of the composite carrier signal results.

17. The method of claim 16, wherein demodulating comprises demodulating the modulated composite carrier signal that has been modulated using a modulation technique of Amplitude Shift Keying (ASK) or On-Off Keying (OOK).

18. The method of claim 16, further comprising recording, using a recording device, the demodulated composite carrier signal.

19. The method of claim 16, further comprising processing, using a spectrum analysis device, the demodulated composite carrier signal.

20. The method of claim 16, further comprising, detecting based on a power detection output, that the composite carrier signal contains information that identifies the transmission source of the composite carrier signal prior to demodulating the composite carrier signal.

21. The method of claim 16, further comprising tracking the composite carrier signal if the composite carrier signal is sweeping or moving in frequency.

22. The method of claim 16, further comprising displaying, by a computing device, an output of the meta-data.

23. A system for analyzing an electromagnetic (EM) carrier signal that is operating outside transmission parameters, the system comprising:

a processing device configured to determine that an original carrier signal is operating outside one or more transmission parameters and to mute the original carrier signal and replace the original carrier signal with a representation of the original carrier signal that is at a same frequency as the original carrier signal;

a modulator configured to modulate the original carrier signal and a meta-carrier signal in response to the processor determining that the original carrier signal is operating outside the one or more transmission parameters, the meta-carrier signal comprising meta-data that identifies a transmission source, such that a modulated composite carrier signal results; and a transmitting device configured to transmit the composite carrier signal to a remote receiving device.

24. The system of claim 23, wherein the processing device is further configured to determine a center frequency of the original carrier signal using a Fourier Transform technique.

25. The system of claim 23, wherein the processing device is further configured to receive dynamic information relating to one or more detection characteristics, the dynamic information used to determine that an output signal from the electronic RF transmission device is operating outside one or more transmission parameters.

26. The system of claim 23, wherein the processing device is further configured to determine an occupied bandwidth of the original carrier signal.

27. The system of claim 23, further comprising a power detector configured to determine a power level of the original carrier signal.

28. The system of claim 23, wherein the processing device is further configured to use logic to determine the existence of sweeping or changing of frequency of the original carrier signal outside of a predetermined frequency range and attempt to mute the original carrier signal if it is determined that the original carrier signal is sweeping or changing frequency outside of the predetermined frequency range.

29. The system of claim 26, wherein the processing device is further configured to use logic to determine occupation by the original carrier signal of a bandwidth that exceeds a predetermined bandwidth range and attempt to mute the original carrier signal if it is determined that the original carrier signal occupies a bandwidth that exceeds the predetermined bandwidth range.

30. The system of claim 27, wherein the processing device is further configured to use logic to determine occupation by the original carrier signal of a power level that is outside of a predetermined power level range and attempt to mute the original carrier signal if it is determined that the power level of the original carrier is outside the predetermined power level range.

31. The system of claim 23, wherein the modulator is further configured to use an Amplitude Shift Keying (ASK) or an On-Off Keying (OOK) modulation technique.

32. The system of claim 23, further comprising an external power source configured to power the processing device, a detection device, and an embedding device.

33. The system of claim 32, wherein the processing and detection devices are external to and downstream from the transmitting device.

34. The system of claim 33, wherein the power amplifier is configured to be powered using energy from the composite carrier signal.

35. The system of claim 23, wherein the meta-data further comprises a manufacturer or serial number of the transmitting device.

36. The system of claim 23, wherein the representation of the original carrier signal is a continuous wave carrier signal.

37. The system of claim 36, wherein the continuous wave carrier signal is modulated.

38. The system of claim 23, further comprising:
a receiving device configured to receive the modulated composite carrier signal comprised of the original carrier signal and the meta-carrier signal;
a processing device configured to detect a modulated power envelope of the composite carrier signal and determine based on the detection, that the composite carrier signal contains information that identifies the transmission source of the composite carrier signal;
a demodulator configured to demodulate the modulated composite carrier signal such that a demodulated original carrier signal and a demodulated meta-carrier signal result; and
a decoder configured to decode the demodulated meta-carrier signal such that meta-data that identifies the transmission source of the composite carrier signal results.

39. The system of claim 38, wherein demodulating comprises demodulating the modulated composite carrier signal that has been modulated using a modulation technique of Amplitude Shift Keying (ASK) or On-Off Keying (OOK).

40. The system of claim 38, further comprising a recording device configured to record the demodulated composite carrier signal.

41. The system of claim 38, further comprising a spectrum analysis device configured to observe and record the demodulated composite carrier signal.

42. The system of claim 38, wherein the processing device is further configured to detect, based on a power detection output, that the composite carrier signal contains information that identifies the transmission source of the composite carrier signal prior to demodulation of the composite carrier signal.

43. The system of claim 38, further comprising a tracking device configured to track the composite carrier signal if the composite carrier signal is sweeping or moving in frequency.

44. The system of claim 38, further comprising a display configured to display an output of the meta-data.

* * * * *